United States Patent
Chong et al.

(10) Patent No.: US 10,044,377 B1
(45) Date of Patent: Aug. 7, 2018

(54) HIGH SWING TRANSMITTER DRIVER WITH VOLTAGE BOOST

(71) Applicants: Euhan Chong, Ottawa (CA); Yingying Fu, Toronto (CA)

(72) Inventors: Euhan Chong, Ottawa (CA); Yingying Fu, Toronto (CA)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 15/425,262

(22) Filed: Feb. 6, 2017

(51) Int. Cl.
| | |
|---|---|
| *H03K 3/00* | (2006.01) |
| *H03D 3/00* | (2006.01) |
| *H04L 27/00* | (2006.01) |
| *H04B 1/04* | (2006.01) |
| *H03K 17/687* | (2006.01) |
| *H04L 27/04* | (2006.01) |
| *H04L 25/02* | (2006.01) |

(52) U.S. Cl.
CPC .......... *H04B 1/04* (2013.01); *H03K 17/6872* (2013.01); *H04L 25/0272* (2013.01); *H04L 27/04* (2013.01)

(58) Field of Classification Search
USPC ....... 327/108, 101, 102, 103, 111, 109, 283, 327/344; 330/250, 7; 375/219, 220, 222, 375/240, 240.26, 259, 295, 316, 346
See application file for complete search history.

(56) References Cited

U.S. PATENT DOCUMENTS

| | | | |
|---|---|---|---|
| 6,351,185 B1 * | 2/2002 | Amrany | H03F 3/3022 330/146 |
| 6,429,987 B1 * | 8/2002 | Cheng | G11B 5/02 360/46 |
| 6,452,833 B2 * | 9/2002 | Akita | G11C 7/12 365/149 |
| 7,532,048 B1 * | 5/2009 | Shirani | H04L 25/028 327/108 |
| 7,964,992 B2 * | 6/2011 | Apfel | H02M 3/156 307/82 |
| 8,220,947 B2 * | 7/2012 | Arai | H03F 3/45183 326/112 |
| 8,581,628 B2 * | 11/2013 | Yeh | G08C 19/00 326/115 |
| 8,710,752 B2 * | 4/2014 | Jin | H05B 33/0815 315/186 |
| 8,884,548 B2 * | 11/2014 | Martin-Lopez | H05B 37/02 315/291 |
| 9,608,845 B2 * | 3/2017 | Chong | H04L 25/03019 |

(Continued)

FOREIGN PATENT DOCUMENTS

CN 103220244 A 7/2013

OTHER PUBLICATIONS

Bassi et al., "A 45 Gb/s PAM-4 Transmitter Delivering 1.3Vppd Output Swing with 1V Supply in 28nm CMOS FDSOI", ISSCC 2016/Session 3/Ultra-High-Speed Transceivers/3.6.

(Continued)

*Primary Examiner* — Linda Wong

(57) ABSTRACT

A transmitter driver is disclosed. The transmitter driver includes first and second voltage mode drivers and a secondary data path. The secondary data path is connected in parallel with the first and second voltage mode drivers. A high frequency booster provides a high frequency path for boost current from the current source, to enable a high frequency voltage boost at the output ports.

17 Claims, 10 Drawing Sheets

(56) References Cited

U.S. PATENT DOCUMENTS

| | | | |
|---|---|---|---|
| 9,710,411 B2* | 7/2017 | Maung | G06F 13/385 |
| 2001/0012214 A1* | 8/2001 | Akita | G11C 7/12 |
| | | | 365/149 |
| 2003/0174778 A1* | 9/2003 | Webster | G09G 5/006 |
| | | | 375/257 |
| 2009/0153991 A1* | 6/2009 | Escobar-Bowser | G11B 5/02 |
| | | | 360/27 |
| 2010/0073036 A1* | 3/2010 | Takeuchi | H03F 3/4521 |
| | | | 327/108 |
| 2011/0148854 A1* | 6/2011 | Uehara | G09G 3/3696 |
| | | | 345/213 |
| 2011/0234317 A1* | 9/2011 | Arai | H03F 3/45183 |
| | | | 330/253 |
| 2012/0169403 A1* | 7/2012 | Gupta | H04L 25/0272 |
| | | | 327/530 |
| 2012/0194262 A1* | 8/2012 | Uochi | H01L 21/28273 |
| | | | 327/534 |
| 2012/0286869 A1* | 11/2012 | Kim | H03F 3/45179 |
| | | | 330/253 |
| 2013/0003882 A1* | 1/2013 | K.S.V. | H04L 25/0286 |
| | | | 375/259 |
| 2014/0103979 A1 | 4/2014 | Kim et al. | |
| 2014/0104909 A1* | 4/2014 | Kwong | H02M 7/219 |
| | | | 363/127 |
| 2014/0132592 A1* | 5/2014 | Liu | H04B 1/04 |
| | | | 345/214 |
| 2014/0227989 A1* | 8/2014 | Suzuki | H03D 7/1441 |
| | | | 455/326 |
| 2014/0239810 A1* | 8/2014 | Martin-Lopez | H05B 37/02 |
| | | | 315/85 |
| 2015/0055431 A1 | 2/2015 | Lin | |
| 2015/0180646 A1* | 6/2015 | Zerbe | H04L 25/03038 |
| | | | 375/233 |
| 2015/0194884 A1* | 7/2015 | Levesque | H03F 3/193 |
| | | | 375/297 |
| 2015/0281831 A1* | 10/2015 | Ibusuki | H03F 3/183 |
| | | | 381/74 |
| 2015/0319020 A1 | 11/2015 | Song et al. | |
| 2016/0072645 A1 | 3/2016 | Chen et al. | |
| 2016/0087819 A1* | 3/2016 | Poulton | H04L 25/0272 |
| | | | 375/230 |
| 2016/0181953 A1* | 6/2016 | Oyama | B62D 5/0487 |
| | | | 180/446 |
| 2016/0197598 A1* | 7/2016 | Wu | H04B 1/04 |
| | | | 327/108 |
| 2016/0254932 A1* | 9/2016 | Chong | H04L 25/03019 |
| | | | 375/233 |
| 2017/0005836 A1* | 1/2017 | Agrawal | H04L 5/20 |
| 2017/0025172 A1* | 1/2017 | Uochi | G11C 11/404 |
| 2017/0147136 A1* | 5/2017 | Noguchi | G06F 3/0412 |
| 2017/0179945 A1* | 6/2017 | Seshita | H03K 17/223 |
| 2017/0207703 A1* | 7/2017 | Houston | H02M 3/1582 |

OTHER PUBLICATIONS

Joy et al., "Analog-DFE-Based 16Gb/s SerDes in 40nm CMOS That Operates Across 34dB Loss Channels at Nyquist with Baud Rate CDR and 1.2Vpp Voltage-Mode Driver", ISSCC 2011/Session 20/High-Speed Transceivers & Building Blocks/20.3.

* cited by examiner

HIGH SWING TRANSMITTER DRIVER WITH VOLTAGE BOOST

FIELD

The present disclosure is related to transmitter drivers, in particular transmitter drivers for high speed transmission.

BACKGROUND

Pulse amplitude modulation (PAM) is a form of signal modulation where bit values are encoded in the amplitude of signal pulses. PAM4 is a form of PAM in which four distinct amplitude levels are used, each amplitude level encoding a different combination of two bits. PAM4 signaling has shown promise for high speed signaling (e.g., greater than 56 Gbps), compared to non-return to zero (NRZ) signaling.

A challenge of PAM4 signaling, compared to NRZ signaling, is that in PAM4 signaling the signal swing is decreased by ⅓ (or 9.5 dB) compared to NRZ signaling. This is even more problematic when considering technologies that require low power supplies and low breakdown voltages. In addition, bandwidth limitation at high data rates (e.g., greater than 56 Gbps) has been found to degrade the vertical eye opening in the eye diagram.

There have been attempts to increase the output swing using a high efficiency voltage mode driver in combination with a current mode logic (CML) current boost circuit. However, the increase to voltage swing achieved in these attempts may not be sufficient, particularly at high frequencies (e.g., greater than 56 Gbps). A finite impulse response (FIR) filter may be used to provide some voltage boost, however this requires significant power and physical area to implement. The use of a FIR filter may also be limited by the number of taps that must be implemented.

SUMMARY

The present disclosure describes a circuit for increasing the bandwidth of a transmitter driver, without directly loading the transmitter output.

A continuous time high-pass filter response is added to the transmitter output, using an AC-coupled feed-forward path. The capacitor-coupled path causes the voltage at the current source to change, such that more current is injected to the output at data transmission. This additional current helps to boost the voltage of high frequency signals, and has little or no effect on low frequency signals.

In some examples, the transmitter driver includes control switches to enable the bandwidth to be adapted for different data rates.

According to a first aspect of the invention, there is described, a transmitter driver comprising a first voltage mode driver coupled to receive a first differential input signal from a first input port of the transmitter driver, and coupled to provide a first differential output signal at a first output port of the transmitter driver. The driver further comprises a second voltage mode driver coupled to receive a second differential input signal from a second input port of the transmitter driver, and coupled to provide a second differential output signal at a second output port of the transmitter driver. The driver further comprises a secondary data path having first input and output ports connected in parallel with the first voltage mode driver, and having second input and output ports connected in parallel with the second voltage mode driver, the secondary data path receiving boost current from a current source. Also, the driver comprises a high frequency booster connected to the first and second input ports of the transmitter driver, and connected between the current source and the secondary data path, the high frequency booster providing a high frequency path for the boost current from the current source.

According to a second aspect of the invention, there is described a transmitter for transmitting differential signals, comprising a transmitter driver including a first voltage mode driver coupled to receive a first differential input signal from a first input port of the transmitter driver, and coupled to provide a first differential output signal at a first output port of the transmitter driver. The transmitter also comprises a second voltage mode driver coupled to receive a second differential input signal from a second input port of the transmitter driver, and coupled to provide a second differential output signal at a second output port of the transmitter driver. The transmitter further comprises a secondary data path having first input and output ports connected in parallel with the first voltage mode driver, and having second input and output ports connected in parallel with the second voltage mode driver, the secondary data path receiving boost current from a current source. Still further the transmitter comprises a high frequency booster connected to the first and second input ports of the transmitter driver, and connected between the current source and the secondary data path, the high frequency booster providing a high frequency path for the boost current from the current source; and a processor coupled to the transmitter driver for controlling operation of the transmitter driver.

According to an implementation of the previous aspects, the high frequency booster comprises a respective RC network connected to each of the first and second input ports of the transmitter driver to provide the high frequency path, each of the RC networks including a feedforward capacitor and a resistor.

According to an implementation of the previous implementation, the resistor of each RC network is a variable resistor.

According to an implementation of the previous implementation, resistance of each variable resistor is controllably variable in the range of about 0 ohms to about 1000 ohms.

According to an implementation of any of the previous implementations, capacitance of each feedforward capacitor is in the range of about 10 fF to about 100 fF.

According to an implementation of any of the previous implementations each feedforward capacitor is a variable capacitor.

According to an implementation of any of the previous implementations, this implementation further comprises a first set of control switches connected to the high frequency booster to enable or disable the high frequency path.

According to an implementation of the previous implementation, this implementation further comprises a second set of control switches connected to the secondary data path to enable or disable receiving of the boost current.

According to an implementation of the second aspect or any implementation thereof, the transmitter is coupled to a receiver via differential communication lines.

BRIEF DESCRIPTION OF THE DRAWINGS

Reference will now be made, by way of example, to the accompanying drawings which show example embodiments of the present application, and in which.

Similar reference numerals may have been used in different figures to denote similar components.

DESCRIPTION OF EXAMPLE EMBODIMENTS

Examples described herein may be implemented in a high speed (e.g., 56 Gbps or higher) communication system. Other applications may include other communication systems and transmitters that would benefit from a transmission boost at high frequencies.

Figure 1:
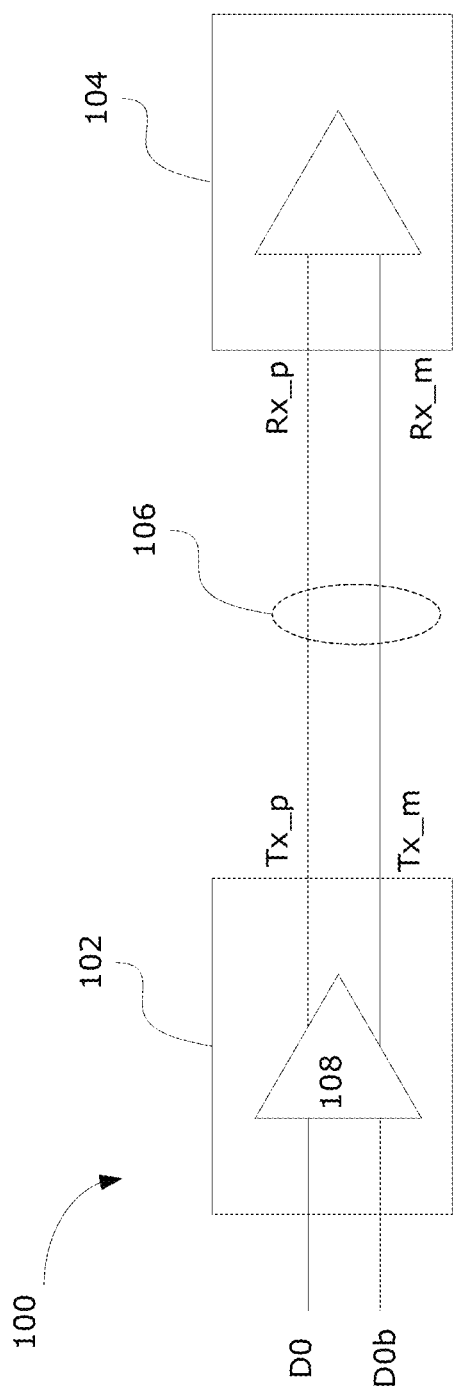
FIG. 1 is a schematic diagram of an example transmitter and receiver system for high speed communication.

FIG. 1 is a schematic diagram of an example high speed communication system 100, including a transmitter 102 and a receiver 104. The transmitter transmits differential signals to the receiver over differential communication lines 106. The use of differential signals may help to reduce the level of noise in signals received by the receiver 104, particularly where there is greater distance between the transmitter 102 and the receiver 104.

In the example shown, the transmitter 102 includes a transmitter driver 108. Although shown as a single symbol in FIG. 1, the transmitter driver 108 may include more than one circuit component, as discussed further below. As well, the transmitter 102 may include other components in addition to the transmitter driver 108. The transmitter 102 receives input data signals at transmitter input ports D0 and D0b, and outputs differential signals at transmitter output ports Tx_m and Tx_p. The differential signals are transmitted over the differential communication lines 106 and received by the receiver 104 at receiver input ports Rx_m and Rx_p.

Figure 2A:
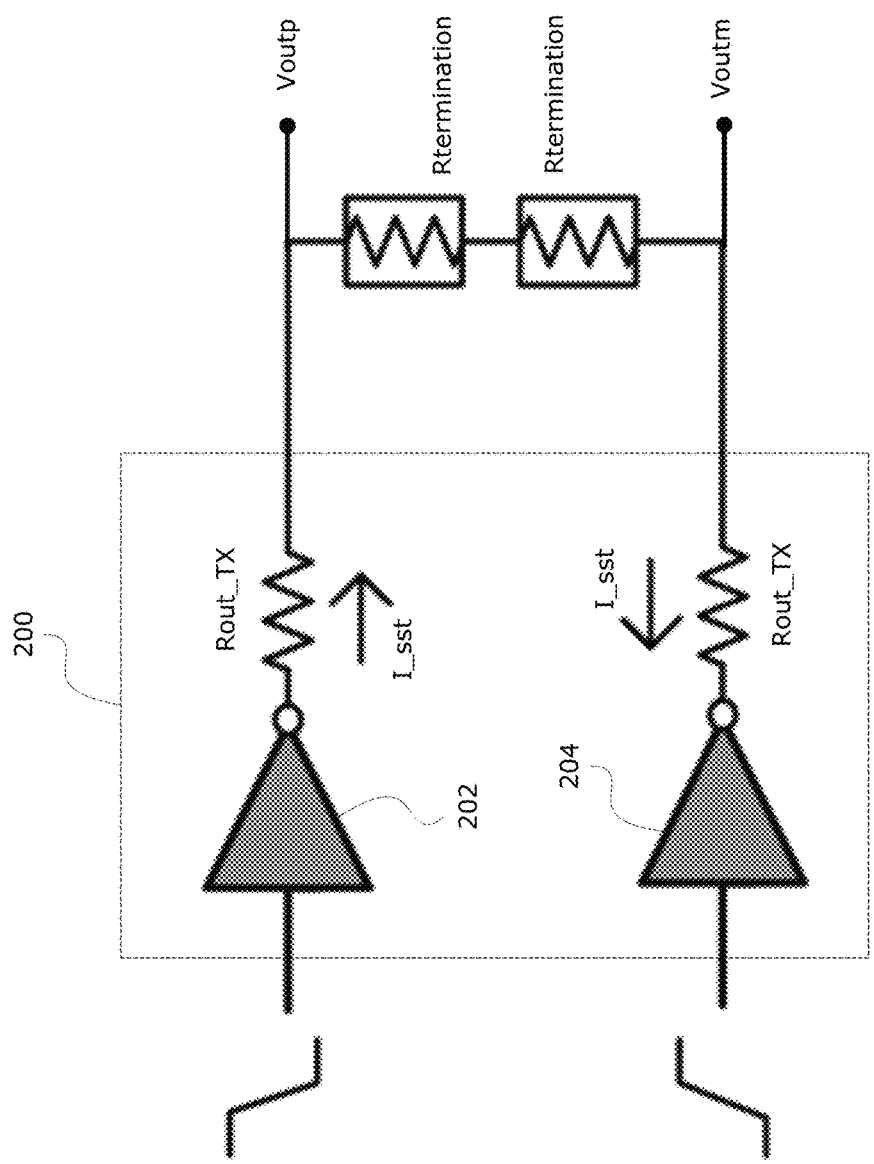
FIGS. 2A and 2B are simplified diagrams illustrating effect of a boost current for a transmitter driver.
Figure 2B:
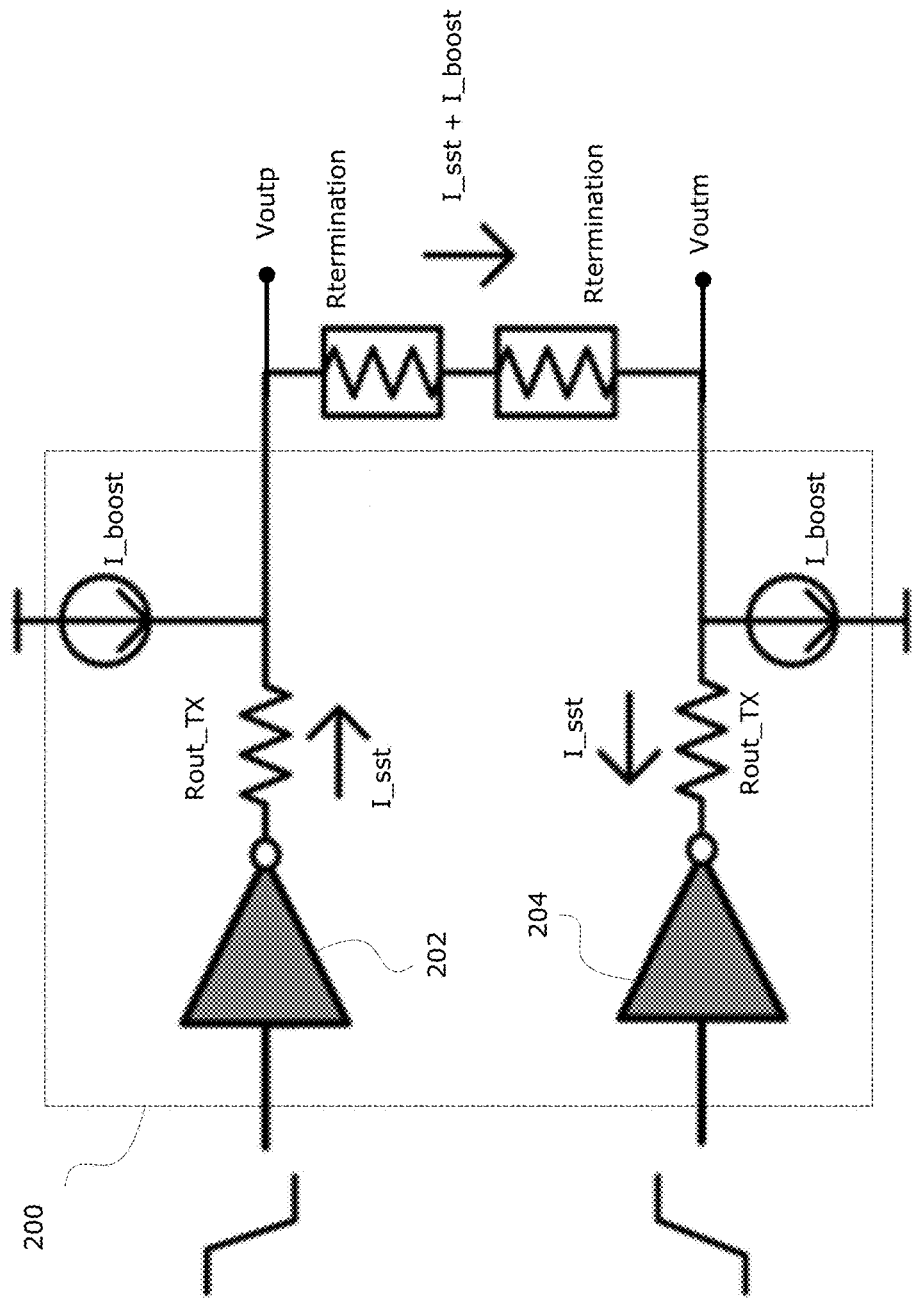

To assist in understanding the present disclosure, FIGS. 2A and 2B are now discussed. FIG. 2A is a simplified diagram illustrating a source-series-terminated (SST) transmitter driver 200, and FIG. 2B shows the SST transmitter driver 200 with a DC voltage boost. In FIG. 2A, first and second voltage mode transmitters 202, 204 are connected to respective resistors Rout_TX (assuming fixed output resistance). The voltage mode transmitters 202, 204 each receive respective differential input signals, as shown. The current from each voltage mode transmitter 202, 204 is I_sst. Far-end termination resistors are shown as Rtermination, and the output signals of the transmitter driver 200 are the differential signals at Voutp and Voutm. The peak-to-peak voltage of the output signals, also referred to as voltage swing, is limited by the voltage supply (Vsupply) as follows:

$$\text{Vout\_pp} = \frac{2 * \text{Rtermination}}{2 * \text{Rtermination} + 2 * \text{Rout\_TX}} * \text{Vsupply} * 2$$

To increase the voltage swing, a DC current boost may be added, as shown in FIG. 2B, where a current source I_boost is connected to the outputs of each voltage mode transmitter 202, 204. Thus, the total current the transmitter driver 200 delivers to the termination resistors Rtermination is I_sst+I_boost. The DC voltage boost at the output Voutp and Voutm is dependent on the values of Rout_TX, Rtermination and I_boost. In the case were Rout_TX and Rtermination have the same resistance R, the voltage swing boost achieved is 2*I_boost*R. The following table shows example simulation results demonstrating the effect of I_boost on the output voltage swing, in the case where Rout_TX and Rtermination are both 50 ohms and the transmitter driver consumes about 5 mA.

| I_boost (mA) | Vswing (Vppd) | V_boost (mV) |
|---|---|---|
| 0 | 1 | 0 |
| 2.2 | 1.2 | 220 |
| 3.3 | 1.3 | 330 | where Vswing is the peak-to-peak voltage of the voltage output and V_boost is the additional voltage boost resulting from I_boost (that is, the additional peak-to-peak voltage of Vswing provided by I_boost, compared to the case where I_boost is 0mA). As noted above, the voltage boost provided is a DC voltage boost, meaning that it is not specific to high frequency output. Because a current boost gives rise to an output voltage boost, in the present disclosure both the terms "current boost" and "voltage boost" may be used interchangeably, and the term "boost" may be used generally to refer to both current boost and voltage boost. A high frequency boost may generally refer to current and voltage boost for high frequency input signals (e.g., signals at frequencies up to 14 GHz). A high frequency boost may be observed as a transient boost in signal amplitude at the top of a rise in a pulse signal, and this boost at the top of a rise may be referred to as "peaking".

Figure 3:
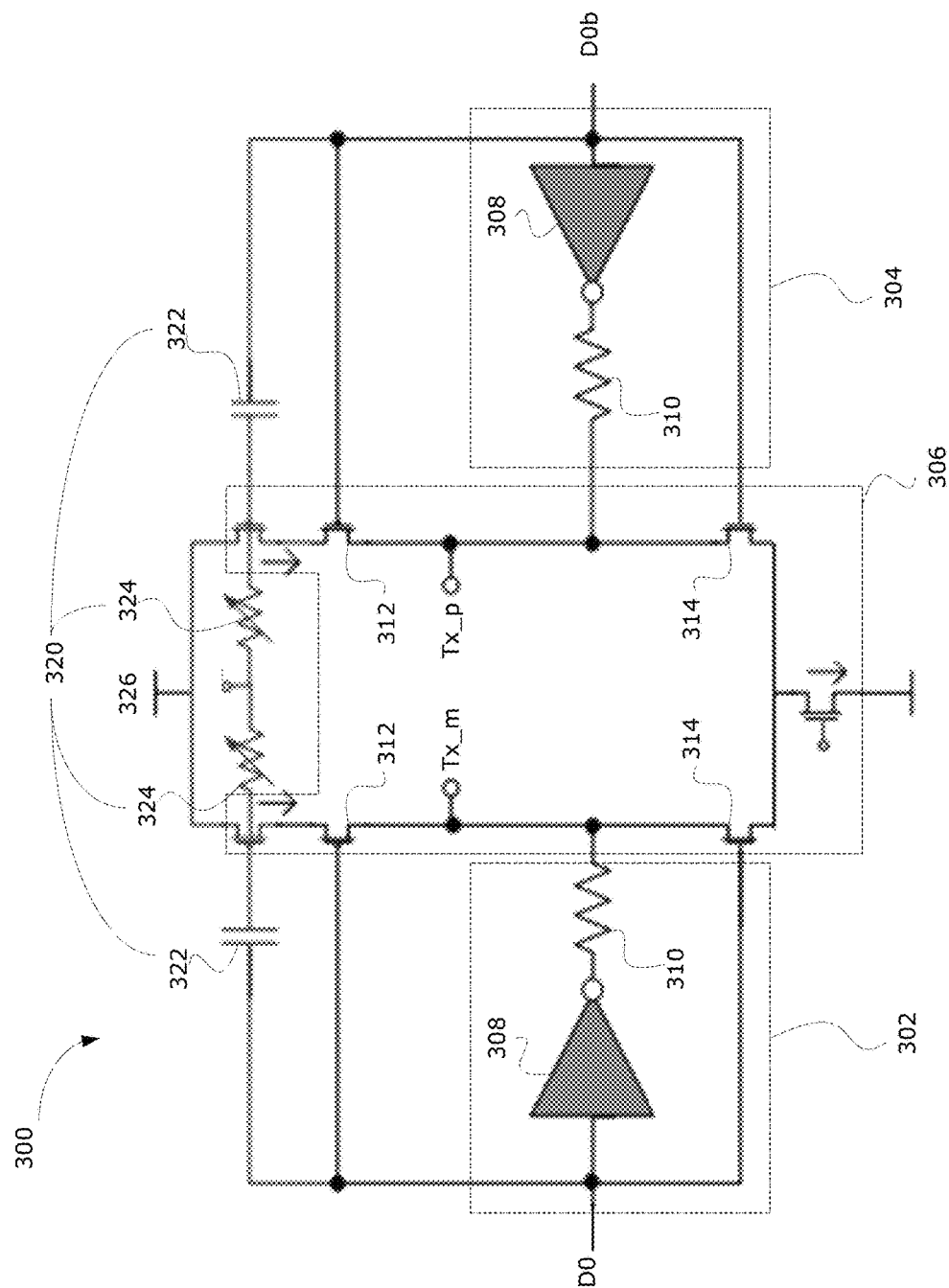
FIG. 3 is a schematic diagram of an example circuit for a transmitter driver, in which high frequency boost is provided.

FIG. 3 shows a schematic diagram of an example circuit 300 for the transmitter driver, in which a high frequency voltage boost is enabled. The circuit 300 includes first and second voltage mode transmitters 302, 304 (which may also be referred to collectively as differential voltage mode transmitters 302, 304) and a secondary data path 306 connected in parallel.

The first voltage mode transmitter 302 is coupled to the input port D0 of the transmitter driver, to receive a first differential input signal, and coupled to the output port Tx_m of the transmitter driver, to output a first differential output signal. The second voltage mode transmitter 304 is coupled to the input port D0b of the transmitter driver, to receive a second differential input signal, and coupled to the output port Tx_p of the transmitter driver, to output a second differential output signal. In the example shown, each of the first and second voltage mode transmitters 302, 304 includes an inverter 308 and a resistor 310. Each inverter 308 receives input from the input port D0, D0b, respectively, and is coupled to the output port Tx_m, Tx_p, respectively, via the respective resistor 310. The resistance value of each of the resistor 310 may be selected to match the expected impedance of the transmission line coupled to the output ports Tx_m, Tx_p. For example, the resistors 310 may each have a resistance of 50 ohms.

The secondary data path 306 has first input and output ports connected in parallel with the first voltage mode transmitter 302, and second input and output ports connected in parallel with the second voltage mode transmitter 304. The secondary data path 306 includes a first transistor differential pair, formed by a first pair of PMOS transistors 312. The gate of each of the PMOS transistors 312 is connected to the input port D0, D0b, respectively, and the drain of each PMOS transistor 312 is connected to the output port Tx_m, Tx_p, respectively. The secondary data path 306 drives the same output as the voltage mode transmitters 302, 304. The secondary data path 306 also includes a second transistor differential pair, formed by a second pair of PMOS transistors 314. The second pair of PMOS transistors 314 is connected to transistor current source.

The secondary data path 306 receives a boost current from a DC current source 326. The boost current provided by the DC current source 326 results in a boost at the output ports Tx_m, Tx_p. The example circuit 300 also includes a high frequency booster 320. The high frequency booster is connected to the input ports D0, D0b, and is connected between the current source 326 and the secondary data path 306. Thus, the current or drive strength of the secondary data path 306 is determined by the high frequency booster 320. The high frequency booster 320 provides a high frequency path for the boost current, enabling a high frequency boost at the output ports Tx_m, Tx_p. The high frequency booster 320 also enables adjustment of the high frequency boost, via variable resistors, described below.

In the high frequency booster 320, the boost current from the current source 326 is split into two currents to the first pair of PMOS transistors 312 of the secondary data path 306. The high frequency path is provided by a RC network for each of the two differential signals. Each RC network includes a feedforward capacitor 322 and a variable resistor 324. The feedforward capacitor 322 is connected between each transmitter input port D0, D0b and the source terminal of the first pair of PMOS transistors 312. The feedforward capacitor 322 may have capacitance in the range of about 10 fF to about 100 fF and the variable resistor 324 may have resistance variable between about 0 ohms to about 1000 ohms, for example. The addition of the feedforward capacitors 322 provides a path for additional boost current at high frequencies. The variable resistors 324 are connected between the feedforward capacitors 322 and a bias voltage for the PMOS transistors 312. The variable resistors 324 are controllable (e.g., via a control signal from a processor (not shown)) to adjust the resistance value of the variable resistors 324, which may enable adjustment of the settling time of the boost current. The peaking frequency may be tuned by adjusting the values of the feedforward capacitors 322 and/or the variable resistors 324. The resistance of the variable resistors 324 may be adjusted dynamically. Simulation results discussed further below illustrate how varying the variable resistors 324 affects the output response. The addition of the high frequency booster 320 introduces relatively little overhead to the circuit 300 for the transmitter driver 108.

In some examples, the feedforward capacitors 322 may be variable capacitors, which may be controllable (e.g., via a control signal from a processor (not shown)) to adjust the capacitance values. The ability to control and adjust the capacitance values of the feedforward capacitors 322 may enable additional control of the high frequency response.

Figure 4:
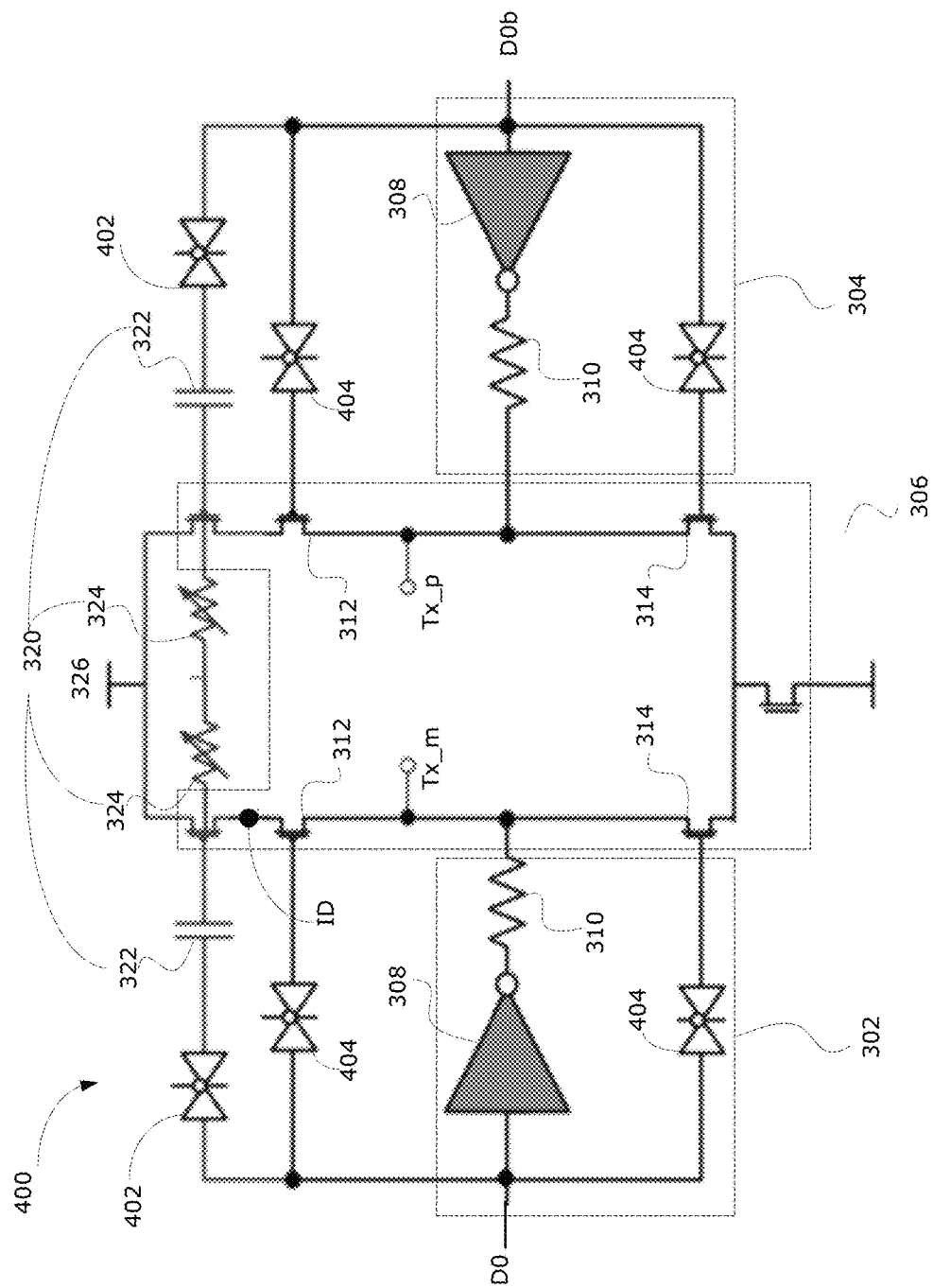
FIG. 4 is a schematic diagram of another example circuit for a transmitter driver, in which high frequency boost is provided.

In some examples, it may be useful to control whether or not voltage boost should be provided. FIG. 4 is a schematic diagram of another example circuit 400 for the transmitter driver 108. The example circuit 400 is similar to the circuit 300 of FIG. 3, with the addition of control switches 402, 404 to control whether or not voltage boost at DC and/or high frequency is enabled. The operation of the control switches 402, 404 may be controlled via control signals from a processor (not shown), for example. The control switches 402, 404 may be turned on or off dynamically. The first set of control switches 402 is provided in the high frequency booster 320, to control whether there is high frequency boost provided. When the first set of control switches 402 are all turned off, the input ports D0, D0b are disconnected from the current source 326, so input data transitions are not used to control the current source 326 to increase the high frequency current, and no high frequency boost is enabled. The second set of control switches 404 is provided at the gates of the first and second pairs of transistors 312, 314, to control whether there is any voltage boost provided. When the second set of control switches 404 are all turned off, the current path for the boost current is open and no boost current (and hence no voltage boost) is enabled.

When both sets of control switches 402, 404 are turned off, no path is provided for the boost current, and the transmitter driver 108 operates without any voltage boost. When the first set of control switches 402 is turned off and the second set of control switches 404 is turned on, only a DC path is provided for the boost current, and the output of the transmitter driver 108 is provided with a DC voltage boost, but without high frequency voltage boost. When both the first and second sets of control switches 402, 404 are turned on, the circuit 400 functions equivalently to the circuit 300 of FIG. 3, where both DC and high frequency voltage boost are enabled. When the first set of control switches 402 is turned on and the second set of control switches 404 is turned on, the transistors 312, 314 are off and no boost is provided. In some examples, only the first set of control switches 402 may be provided, such that the DC voltage boost is always enabled but the high frequency voltage boost can be enabled or disabled.

By enabling the selection of whether or not to provide high frequency boost, independently of whether any DC voltage boost is enabled, the example circuit 400 may help to lower power consumption at low data rates, where the benefits of the high frequency boost may not be needed.

To help in understanding the present disclosure, some example simulation results are now discussed. It should be understood that these simulation results are provided for the purpose of illustration only, and are not intended to be limiting or promissory.

Figure 5A:
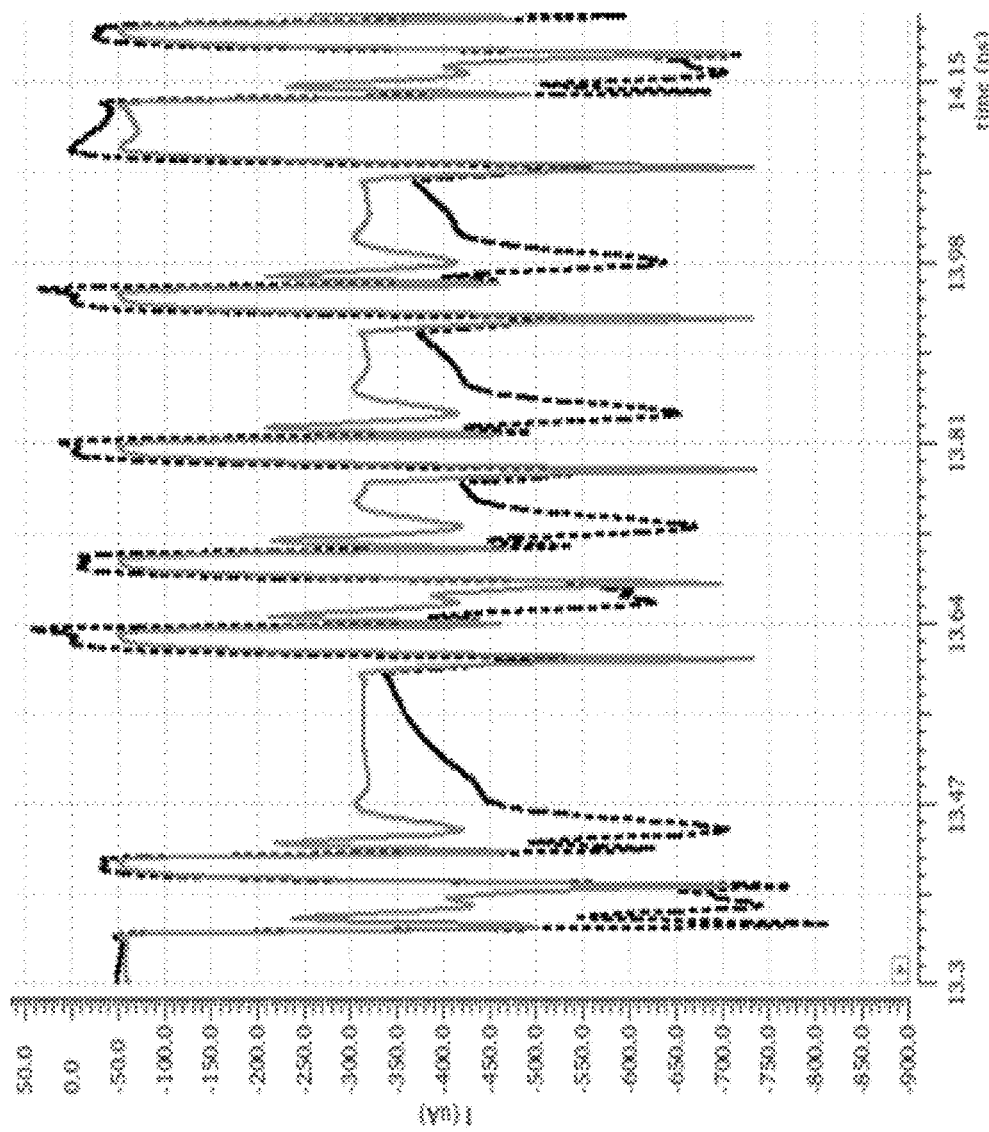
FIGS. 5A and 5B are plots showing the effects of a high frequency boost in the example circuit of FIG. 4.
Figure 5B:
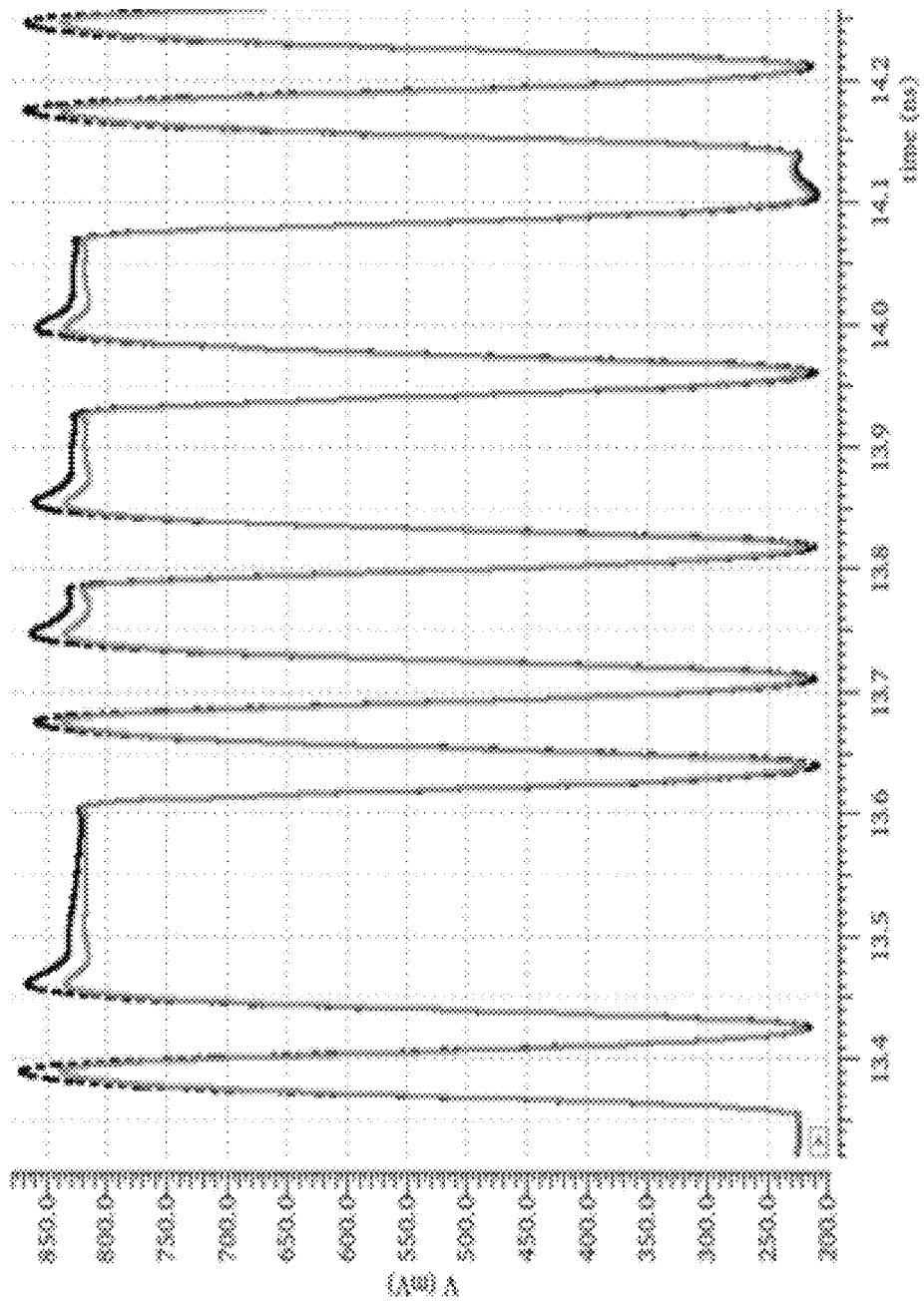

FIGS. 5A and 5B show simulation results for the example circuit 400 of FIG. 4, with only DC boost (grey solid line) and with additional high frequency boost (black dotted line). FIG. 5A shows the current at location ID indicated in FIG. 4, and FIG. 5B shows the output voltage at output ports Tx_m and Tx_p. As can be seen in these plots, when high frequency boost is enabled, additional current is injected when the input signal has a rising transition, resulting in a transient boost in the output voltage at the top of each rise.

Figure 6:
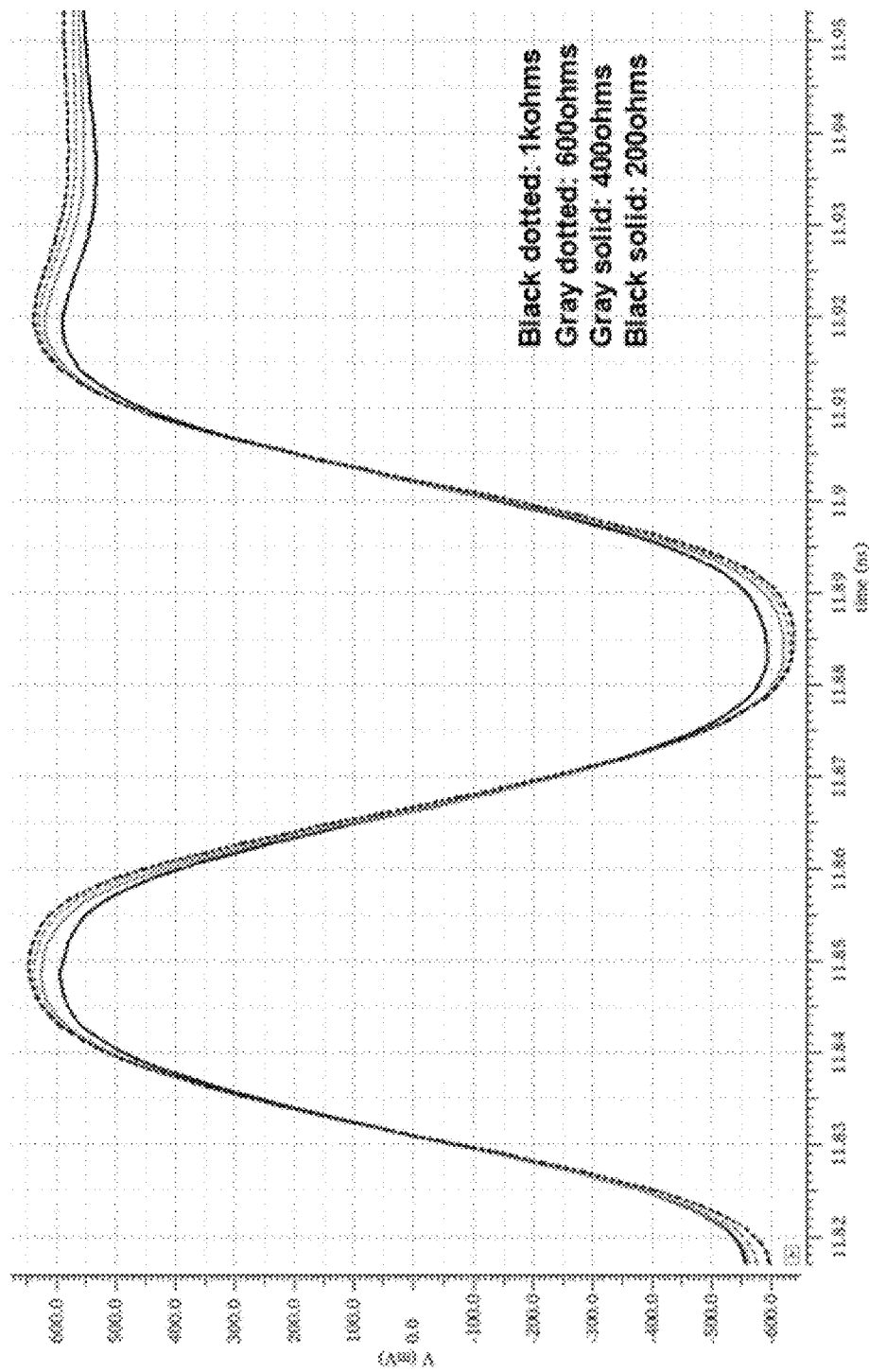
FIG. 6 is a plot showing the effect of different resistance values on an output pulse in the example circuit of FIG. 3.

FIG. 6 is a plot showing a single pulse of a differential output voltage of the example circuit 300 of FIG. 3, illustrating the transient response when the variable resistors are set at different resistance values. As can be seen from the plot, the higher the resistance value the greater the high frequency boost (although this may cause a longer settling time, which may result in intersymbol interference). The rise time is also shorter for higher resistance values.

Figure 7:
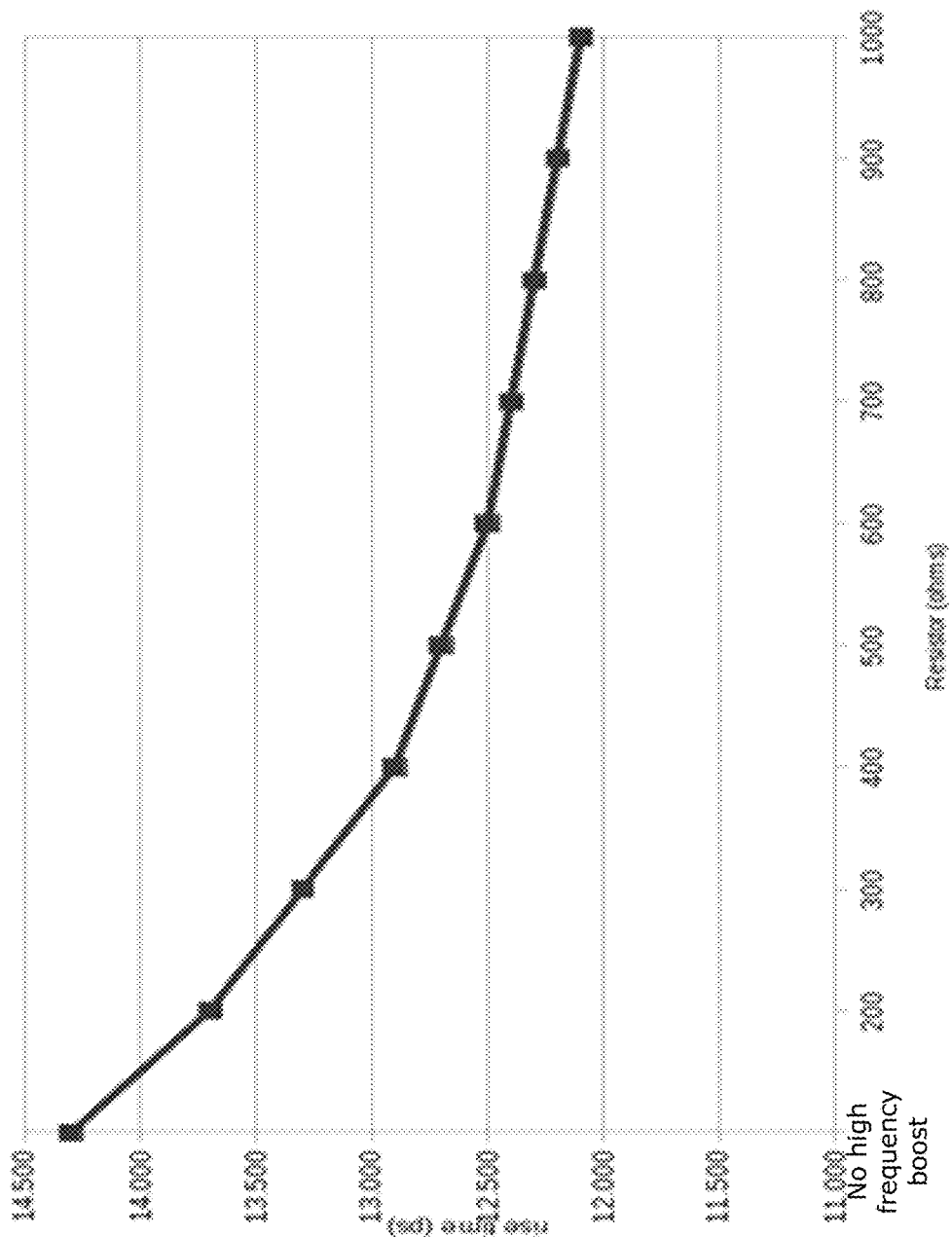
FIG. 7 is a plot showing the effect of different resistance values on the rise time of an output pulse in the example circuit of FIG. 3.

FIG. 7 is a plot showing the rise time of a single pulse of a differential output voltage in the example circuit 300 of FIG. 3, when the variable resistors 324 are set at different resistance values. As illustrated in FIG. 7, when high frequency boost is enabled, the rise time may be reduced by up to about 2.2 ps compared to when no high frequency boost is provided. Thus, the addition of the high frequency booster may enable quicker output response, which may be useful for high speed signaling.

Figure 8:
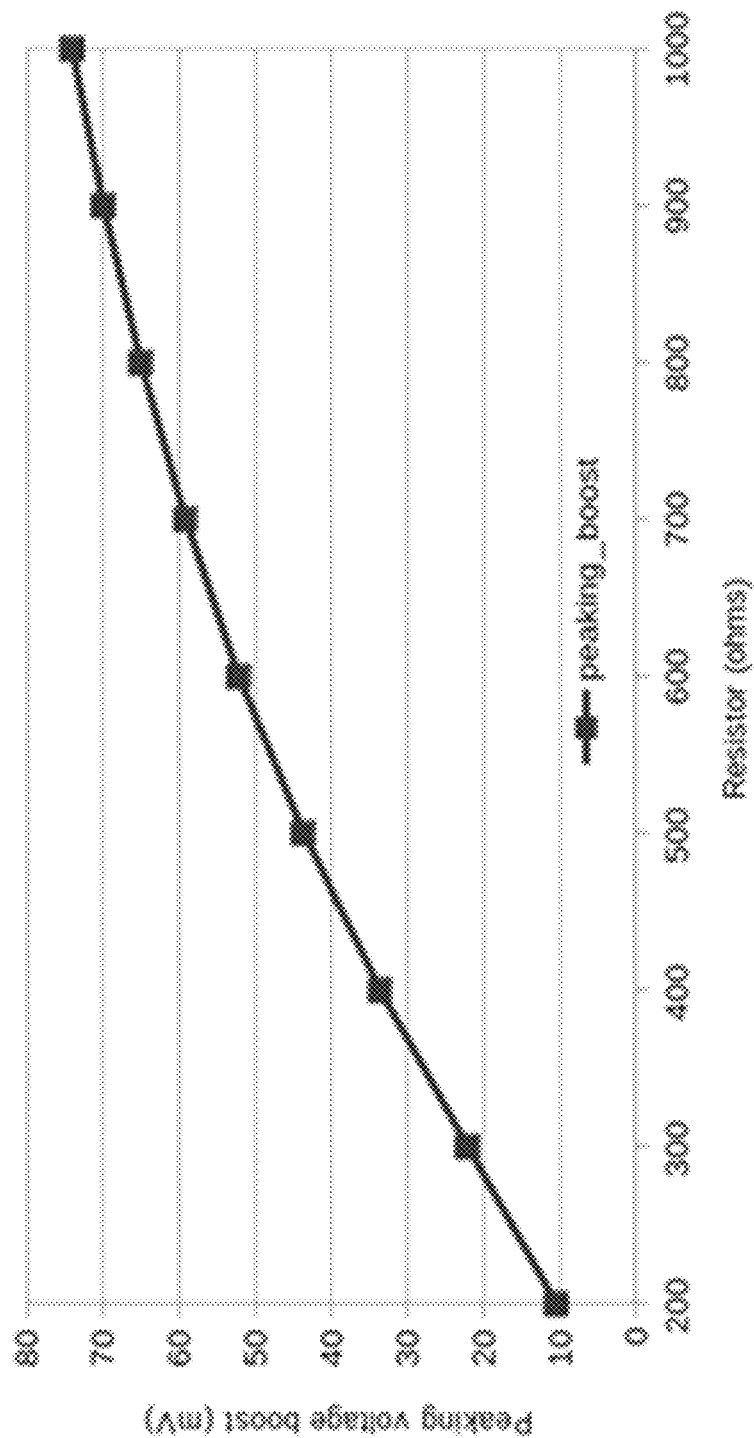
FIG. 8 is a plot showing the effect of different resistance values on the peaking voltage of an output pulse in the example circuit of FIG. 3.

FIG. 8 is a plot showing the peaking voltage of a single pulse of a 1V differential output voltage in the example circuit 300 of FIG. 3, when the variable resistors 324 are set at different resistance values. As illustrated in FIG. 8, by varying the resistance value of the variable resistors 324 from about 200 ohms to about 1000 ohms, the peaking voltage can be controlled to vary between about 10 mV to about 75 mV.

In various examples described herein, a transmitter driver circuit is described in which the output voltage swing is boosted. A high frequency booster is added to the conventional transmitter driver circuit to help improve rise/fall time and help provide a high frequency boost. The use of variable resistors enables control of the frequency range at which high frequency boost is provided. The variable resistors also enable control of rise time and settling time. In some examples, fixed resistors may be used instead of variable resistors (e.g., where the ability to dynamically tune the peaking frequency is not needed). In some examples, control switches may be added to enable the DC voltage boost and high frequency voltage boost to be independently enabled or disabled.

Compared to other solutions that have been attempted (such as described by Bassi et al., "3.5 A 45 Gb/s PAM-4 transmitter delivering 1.3 Vppd output swing with 1V supply in 28 nm CMOS FDSOI", *ISSCC* 2016; and Joy et al., "Analog-DFE-based 16 Gb/s SerDes in 40 nm CMOS that operates across 34 dB loss channels at Nyquist with a baud rate CDR and 1.2 Vpp voltage-mode driver", *ISSCC* 2011), the examples described herein may provide greater voltage boost at high frequencies (e.g., greater than 56 Gbps). Further, the example circuits described herein may enable voltage boost with a smaller overhead and overall smaller size requirements.

Although the present disclosure describes examples implemented in differential transmitters, the present disclosure may also be adapted for single-ended transmitters (e.g., using only high frequency booster with only one feedforward capacitor and one variable resistor).

Various examples described herein may be used to implement PAM4 signaling in various high speed communication systems, including network, storage, computing and mobile systems. The examples described herein may be applicable to standards for high speed communication, for both electrical and optical produces.

Although described in the context of high speed PAM4 signaling, the examples disclosed herein may be useful in other applications where an output voltage boost, in particular a high frequency voltage boost, would be desirable.

The present disclosure may be embodied in other specific forms without departing from the subject matter of the claims. The described example embodiments are to be considered in all respects as being only illustrative and not restrictive. Selected features from one or more of the above-described embodiments may be combined to create alternative embodiments not explicitly described, features suitable for such combinations being understood within the scope of this disclosure.

All values and sub-ranges within disclosed ranges are also disclosed. Also, although the systems, devices and processes disclosed and shown herein may comprise a specific number of elements/components, the systems, devices and assemblies could be modified to include additional or fewer of such elements/components. For example, although any of the elements/components disclosed may be referenced as being singular, the embodiments disclosed herein could be modified to include a plurality of such elements/components. The subject matter described herein intends to cover and embrace all suitable changes in technology.

The invention claimed is:

1. A transmitter driver comprising:
   a first voltage mode driver coupled to receive a first differential input signal from a first input port of the transmitter driver, and coupled to provide a first differential output signal at a first output port of the transmitter driver;
   a second voltage mode driver coupled to receive a second differential input signal from a second input port of the transmitter driver, and coupled to provide a second differential output signal at a second output port of the transmitter driver;
   a secondary data path having first input and output ports connected in parallel with the first voltage mode driver, and having second input and output ports connected in parallel with the second voltage mode driver, the secondary data path receiving boost current from a current source; and
   a high frequency booster connected to the first and second input ports of the transmitter driver, and connected between the current source and the secondary data path, the high frequency booster providing a high frequency path for the boost current from the current source.

2. The transmitter driver of claim 1, wherein the high frequency booster comprises:
   a respective RC network connected to each of the first and second input ports of the transmitter driver to provide the high frequency path, each of the respective RC network connected to each of the first and second input ports of the transmitter driver including a feedforward capacitor and a resistor.

3. The transmitter driver of claim 2, wherein the resistor of each of the respective RC network connected to each of the first and second input ports of the transmitter driver is a variable resistor.

4. The transmitter driver of claim 3, wherein resistance of each of the variable resistor of the respective RC network connected to each of the first and second input ports of the transmitter driver is controllably variable in the range of about 0 ohms to about 1000 ohms.

5. The transmitter driver of claim 2, wherein capacitance of each of the feedforward capacitor of the respective RC network connected to each of the first and second input ports of the transmitter driver is in the range of about 10 femtofarad (fF) to about 100 fF.

6. The transmitter driver of claim 2, wherein each of the feedforward capacitor of the respective RC network connected to each of the first and second input ports of the transmitter driver is a variable capacitor.

7. The transmitter driver of claim 1, further comprising:
   a first set of control switches connected to the high frequency booster to enable or disable the high frequency path.

8. The transmitter driver of claim 7, further comprising:
   a second set of control switches connected to the secondary data path to enable or disable receiving of the boost current.

9. A transmitter for transmitting differential signals, comprising:
a transmitter driver comprising:
a first voltage mode driver coupled to receive a first differential input signal from a first input port of the transmitter driver, and coupled to provide a first differential output signal at a first output port of the transmitter driver;
a second voltage mode driver coupled to receive a second differential input signal from a second input port of the transmitter driver, and coupled to provide a second differential output signal at a second output port of the transmitter driver;
a secondary data path having first input and output ports connected in parallel with the first voltage mode driver, and having second input and output ports connected in parallel with the second voltage mode driver, the secondary data path receiving boost current from a current source; and
a high frequency booster connected to the first and second input ports of the transmitter driver, and connected between the current source and the secondary data path, the high frequency booster providing a high frequency path for the boost current from the current source; and
a processor coupled to the transmitter driver for controlling operation of the transmitter driver.

10. The transmitter of claim 9, wherein the high frequency booster comprises:
a respective RC network connected to each of the first and second input ports of the transmitter driver to provide the high frequency path, each of the respective RC network connected to each of the first and second input ports of the transmitter driver including a feedforward capacitor and a resistor.

11. The transmitter of claim 10, wherein the resistor of each respective RC network connected to each of the first and second input ports of the transmitter driver is a variable resistor, and wherein the processor is coupled to control resistance of each variable resistor.

12. The transmitter of claim 11, wherein resistance of each of the variable resistor of the respective RC network connected to each of the first and second input ports of the transmitter driver is controllably variable in the range of about 0 ohms to about 1000 ohms.

13. The transmitter of claim 10, wherein capacitance of each of the feedforward capacitor of the respective RC network connected to each of the first and second input ports of the transmitter driver is in the range of about 10 femtofarad (fF) to about 100 fF.

14. The transmitter of claim 10, wherein each of the feedforward capacitor of the respective RC network connected to each of the first and second input ports of the transmitter driver is a variable capacitor, and wherein the processor is coupled to control capacitance of each variable capacitor.

15. The transmitter of claim 9, further comprising:
a first set of control switches connected to the high frequency booster to enable or disable the high frequency path;
wherein the processor is coupled to turn on or off the first set of control switches.

16. The transmitter of claim 15, further comprising:
a second set of control switches connected to the secondary data path to enable or disable receiving of the boost current;
wherein the processor is coupled to turn on or off the second set of control switches.

17. The transmitter of claim 9, wherein the transmitter is coupled to a receiver via differential communication lines.

* * * * *